United States Patent Office 3,180,454
Patented Apr. 27, 1965

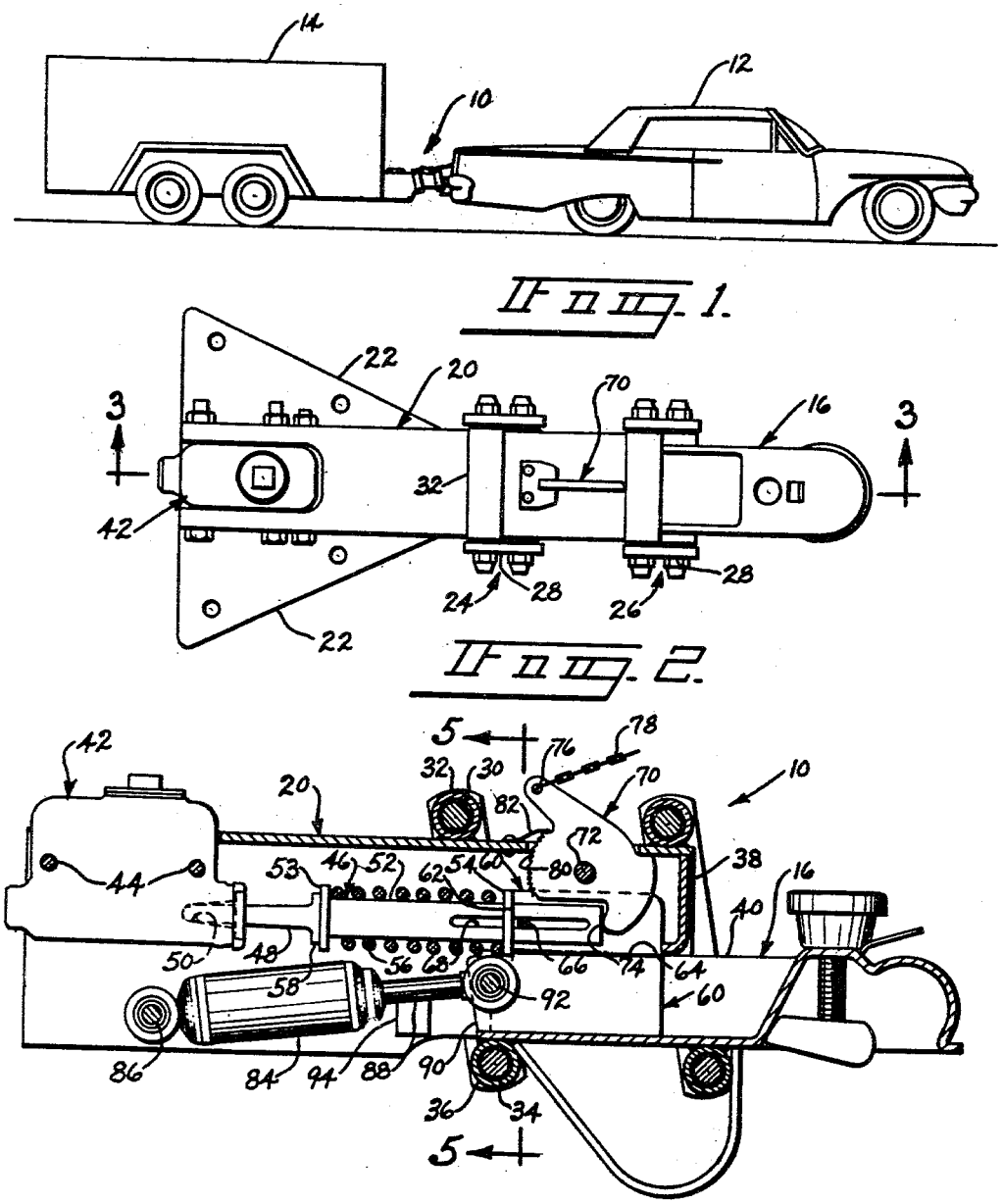

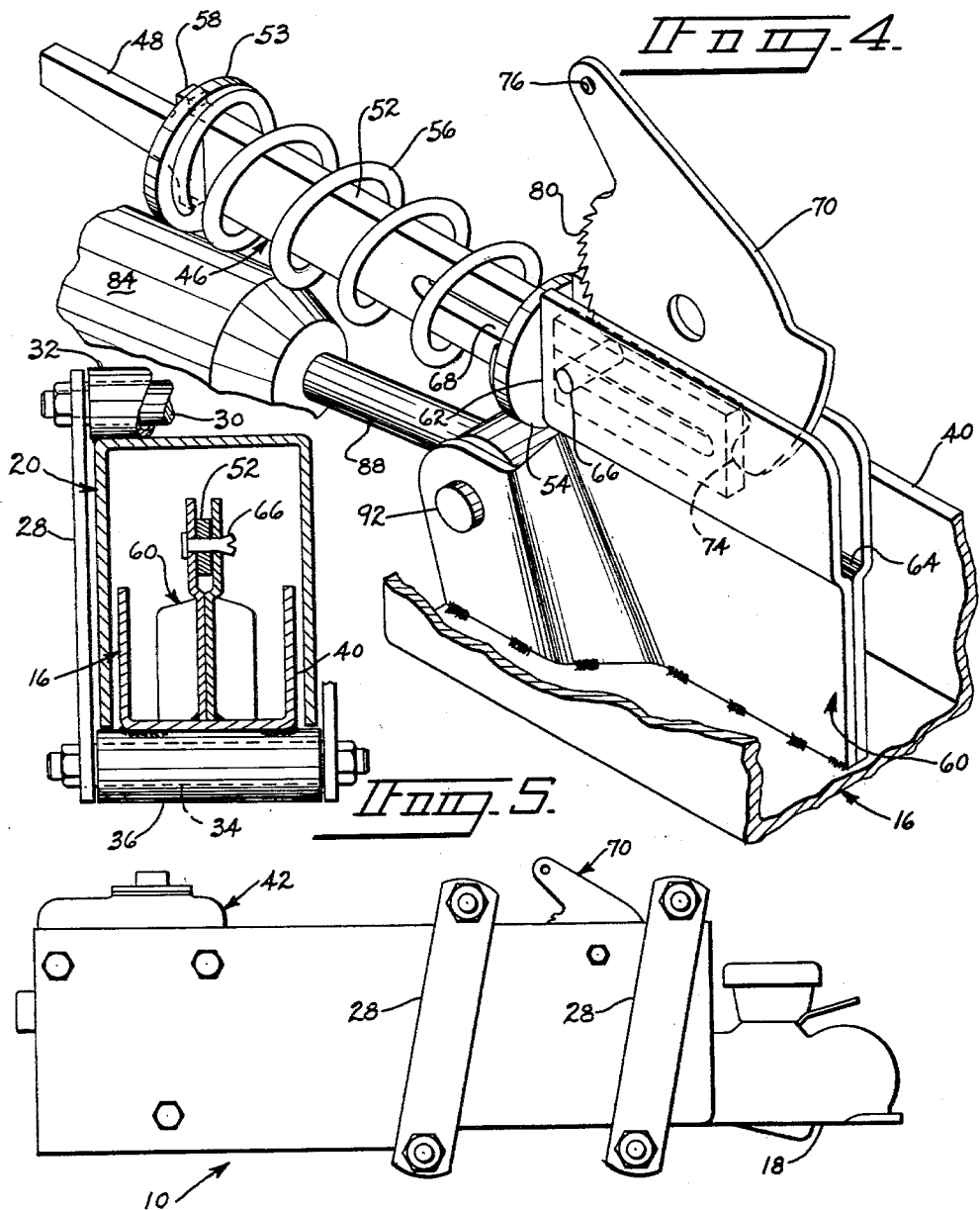

3,180,454
TRAILER HITCH
Eugene De Angelis, Toledo, and Joseph L. Wherry, Perrysburg, Ohio, assignors to Toledo Stamping & Manufacturing Company, Toledo, Ohio, a corporation of Ohio
Filed Oct. 8, 1962, Ser. No. 228,927
2 Claims. (Cl. 188—112)

This invention relates to a trailer hitch and more particularly to a trailer hitch with means for actuating a trailer brake and with resilient means for limiting the amount of pressure applied to the brake.

Trailer hitches with various brake-actuating systems heretofore known ordinarily have had no means for limiting the maximum pressure applied to the trailer brakes. If the trailer hit an obstacle when being backed up, the amount of pressure applied was unlimited, rupturing one or more components of the hydraulic system for the brakes. This also occasionally occurred under extremely rapid stopping conditions when the vehicle and trailer were moving forwardly.

The trailer hitch in accordance with the present invention includes resilient means connected to a brake rod of a master cylinder through which the force on the hydraulic fluid is applied so that the pressure is cushioned. In addition, the movement of the basic members of the trailer hitch is limited so that maximum movement is reached before the resilient means or spring is compressed fully. Hence, the pressure applied to the braking system is limited entirely by the strength of the resilient means or spring. The spring also reduces the chucking or surging action of the trailer which sometimes occurs during sudden application of the brakes of the towing vehicle.

The new trailer hitch also includes a break-away lever which applies the brake if the trailer should become detached from the towing vehicle and acts directly on the brake rod of the hydraulic system independently of the spring, so that immediate and full braking action can be attained in the event of a break away. Further, the brake rod, the shock absorber, and the break-away lever are all associated with a single guide and support element of one of the trailer hitch members to simplify manufacture and to effect a lower cost of the hitch.

It is, therefore, a principal object of the invention to provide an improved trailer hitch with means for limiting the amount of pressure applied to a trailer brake associated with the hitch.

Another object of the invention is to provide an improved trailer hitch with resilient means for limiting the pressure applied to the trailer brake and with a break-away lever capable of acting directly on the brake independently of the resilient means.

A further object of the invention is to provide a less expensive trailer brake hitch having brake pressure limiting means.

Other objects and advantages of the invention will be apparent from the following detailed description of a preferred embodiment thereof, reference being made to the accompanying drawings, in which:

FIG. 1 is a somewhat schematic view in elevation of a vehicle and trailer employing a trailer hitch embodying the invention;

FIG. 2 is a top view of the trailer hitch shown in FIG. 1;

FIG. 3 is a side view in elevation, with parts broken away and parts in cross section, of the trailer brake hitch shown in FIG. 2;

FIG. 4 is a view in perspective of a guiding and supporting element of one of the members of the trailer hitch shown in FIGS. 1–3;

FIG. 5 is a view in cross section taken along the line 5—5 of FIG. 3; and

FIG. 6 is a view in elevation, with parts broken away and with parts in cross section, of the trailer hitch with the rear member thereof in a forward position.

Referring to the drawings, and more particularly to FIG. 1, a trailer hitch embodying the invention is indicated at 10 and is used to connect a towing vehicle 12 with a trailer 14. The hitch automatically applies hydraulic brakes of the trailer when the towing vehicle slows down or stops.

Referring more particularly to FIGS. 2 and 3, the hitch 10 includes a forward member 16 having the usual socket connection 18 to provide a connection with the towing vehicle 12 and a rear member 20 having suitable flanges 22 to provide a connection with the trailer 14. The two members 16 and 20 are connected for movement toward and away from one another by two sets 24 and 26 of parallel links 28 which enable the members 16 and 20 to move parallel to one another between the rear position shown in FIGS. 2 and 3 and the forward position shown in FIG. 6. The upper ends of the links 28 are pivotally connected to the rear member 20 by shafts 30 extending through tube bearings 32, which are welded to the upper member, and the lower ends of the links 28 are pivotally connected to the forward member 16 by shafts 34 extending through tube bearings 36, which are welded to the forward member 16. The front of the rear member 20 is closed off by an end wall 38 to help protect the components therein and the forward member 16 has side walls 40 to add strength and improve the appearance thereof. The end wall 38 and the side walls 40 also help limit the forward and rearward movements of the members 16 and 20, as will be discussed more fully subsequently.

A suitable master cylinder 42 is affixed to the rear member 20 by means of bolts 44 and has a brake rod 46 extending forwardly thereof, the rod 46 having a tapered rearward end 48 cooperating with a tapered socket 50, of wider angle, in the master cylinder 42 to enable limited pivotal movement of the brake rod 46. The tapered socket 50 operates a piston in the master cylinder 42 to apply fluid pressure to the brakes. A forward portion 52 of the brake rod 46 is of flat, rectangular configuration and has slidably mounted thereon two spring abutments 53 and 54, between which and around the rod portion 52 is a resilient coil spring 56. The rear position of the spring abutment 53 is determined by a flange 58 on the tapered end 48 of the brake rod 46 while the forward position of the spring abutment 54 is determined by a supporting and guiding element 60 having a shoulder 62 contacting the abutment 54. The element 60 also provides a groove 64 (see also FIG. 3) with a guide pin 66 extending through a slot 68 in the forward brake rod portion 52 to aid in supporting and guiding the brake rod 46. The slot 68 is sufficiently long that the pin 66 never contacts the ends of it, the relative movement between the members 16 and 20 being stopped before this can occur.

A break-away lever 70 is pivotally supported on the rear trailer hitch member 20 by a bolt 72 with the lever having a rod-contacting shoulder 74 extending into the guide groove 64 beyond the end of the brake rod portion 52. The upper end of the lever 70 has an opening 76 to receive a chain 78 which is connected to the bumper or other suitable part of the towing vehicle 12. If the trailer and the trailer hitch separate accidentally from the towing vehicle, the chain 78 will pull the lever 70 forwardly, in a clockwise direction, until the chain 78 breaks, thereby causing the shoulder 74 to push the brake rod 46 rearwardly and set the brakes through the master cylinder 42. The lever 70 has ratchet teeth 80 and the rear member 20 has a pawl 82 mounted thereon to prevent the return of the lever 70 when the brakes are set. The break-away lever 70 acts directly on the brake rod 46 independently of the spring 56 so that quick and positive action can be attained in an emergency. Otherwise, the brake rod 46 is only moved through the compression of the spring 56 as the rear member 20 moves toward the forward member 16 and the distance between the spring abutments 53 and 54 decreases.

A shock absorber 84 is pivotally supported by the rear member 20 through a bolt 86 and has a rod 88 pivotally connected to ears 90 of the element 60 by a bolt 92. The shock absorber 84 tends to damp movement between the members 16 and 20 and thereby helps, along with the spring 56, to prevent the phenomenon of chucking or surging which sometimes occurs between the members of a trailer brake hitch when the towing vehicle is suddenly stopped or decelerated. In such an instance, the trailer brakes are applied excessively so that the trailer then tends to pull away from the vehicle, whereby the rear hitch member abruptly reaches its rear position and bounces forwardly to again apply the brakes excessively, with the steps then being repeated until the vehicle is stopped completely or until it is again accelerated. The spring 56 also softens the action applied to the master cylinder 42 through the rod 46 and also adds a significant contribution to reduction of the chucking or surging.

It may be noted that the parts of the break-away lever 70, the brake rod 46, and the shock absorber 84 which are associated with the forward member 16 actually contact or cooperate with the supporting and guiding element 60. This enables the rest of the forward member 16 to be of relatively simple design with the more complicated element 60 separately formed and then affixed thereto. The overall cost of manufacture of the hitch can thereby be decreased.

While the overall operation of the trailer hitch 10 will be apparent to those skilled in the art, it will be reviewed briefly at this time. With the vehicle 12 and the trailer 14 traveling at the same rate of speed, the hitch members 16 and 20 are in the position shown in FIGS. 2 and 3. If the vehicle 12 should now slow down, the rear hitch member 20 will tend to move forward relative to the forward hitch member 16, toward the position shown in FIG. 6. As this occurs, the master cylinder 42 and the rod 46 will tend to move toward the supporting element 60 of the front hitch member 16 with the forward rod portion 52 moving further into the guide groove 64 of the element 60. As this happens, the distance between the spring abutments 53 and 54 decreases with the spring 56 then being compressed and resisting the forward movement of the brake rod 46, with the result that the rod 46 moves into the master cylinder 42 to build the pressure of hydraulic fluid in it and transmit this pressure to the brake or brakes of the trailer 14. The trailer 14 will then tend to slow down and as it slows more rapidly than the vehicle 12, the forward hitch member 16 tends to move forwardly relative to the rearward hitch member 20 with the element 60 then moving away from the master cylinder 42 and with the distance between the spring abutments 53 and 54 again increasing so that the compressive force of the spring is decreased or eliminated. This relative motion of the members can continue until the end wall 38 of the rear member 20 contacts the front edge of the element 60 which thereby also serves as a stop. If the vehicle 12 should stop suddenly or if the trailer 14 should be backed up and strike an object, the rear hitch member 20 will move forwardly abruptly relative to the forward hitch member 16 until the limiting movement of FIG. 6 is reached, with the rear ends of the side walls 40 contacting stops 94 (FIG. 3) affixed to the rear member 20. At this time, the compressive force of the spring 56 will be at a maximum and the force of the spring is designed so that this maximum will not cause rupturing of the hydraulic system. For example, if adequate braking force is normally attained with a pressure of 250 p.s.i., then the spring 56 will be designed such that it cannot establish a hydraulic pressure of more than 300 p.s.i. when in its maximum compressed position. The pressure in ordinary trailer hitches with brake actuating means can often exceed 1500 p.s.i. and approach the bursting pressure of one or more components of the hydraulic system.

If the trailer hitch 10 should become loose from the vehicle 12, the break-away chain 78 will actuate the break-away lever 70 so that brake force can be applied directly through the brake rod 46 independently of the spring, thereby assuring rapid and positive action at a time when it is needed.

Various modifications of the above described embodiment of the invention will be apparent to those skilled in the art, and it is to be understood that such modifications can be made without departing from the scope of the invention, if they are within the spirit and the tenor of the accompanying claims.

We claim:
1. A trailer hitch for connecting a trailer and a towing vehicle, said hitch comprising a forward member adapted to be connected to the towing vehicle, a rear member adapted to be connected to the trailer, means connected to said forward and rear members for providing relative movement between them in a direction toward and away from one another, a brake cylinder on one of said members, a brake rod extending outwardly from said cylinder toward the other member, a spring connecting said brake rod at a point spaced from said cylinder to said other member so that said spring must be compressed before said brake rod is moved into said cylinder, stop means movable with said forward and rearward members for limiting relative movement of said members toward one another, said stop means being independent of said brake rod and said spring, said stop means being positioned to stop the relative movement of said members toward one another in a position to establish a predetermined maximum compressive force on said spring, with said spring providing maximum pressure through said brake rod on hydraulic fluid in said cylinder which is less than the bursting pressure of a hydraulic system associated with said cylinder, and a break-away lever pivotally mounted on the same member as said brake cylinder, said lever being positioned to contact directly said brake rod and to actuate said cylinder independently of said spring when said lever is moved by a chain attached to the towing vehicle.

2. A trailer hitch for connecting a trailer and a towing vehicle, said hitch comprising a forward member adapted to be connected to the towing vehicle, a rear member adapted to be connected to the trailer, means connected to said forward and rear members for providing limited relative movement between them in a direction toward and away from one another, a brake cylinder on one of said members, a brake rod extending outwardly from said cylinder toward the other member, a spring having a first portion connected to said brake rod at a point spaced from said cylinder, means movable with said other member and engageable with a second portion of said spring spaced from the first and independent of said brake rod so that said spring must be compressed before said brake rod is moved into said cylinder, said piston rod extending beyond said spring and said spring-moving means and movable independently of both, said spring providing maximum pressure through said brake rod on hydraulic fluid in said cylinder which is less than the bursting pressure of a hydraulic system associated with said cylinder when said members are in a position of maximum relative movement toward one another, and a break-away lever pivotally mounted on the same member as said brake cylinder, said lever being positioned to contact directly said brake rod on the side of said spring opposite said brake cylinder and to actuate said cylinder independently of said spring and said spring-moving means when said lever is moved by a flexible link attached to the towing vehicle.

References Cited by the Examiner
UNITED STATES PATENTS

| | | | |
|---|---|---|---|
| 2,135,097 | 11/38 | Billingsley | 188—112 |
| 2,320,585 | 6/43 | Gill | 188—112 |
| 2,354,268 | 7/44 | McNamara | 188—112 |
| 2,642,961 | 6/53 | Teal | 188—112 |
| 2,954,104 | 9/60 | Shumate | 188—112 |
| 3,007,552 | 11/61 | Eksergian | 188—112 |

ARTHUR L. LA POINT, *Primary Examiner.*

A. JOSEPH GOLDBERG, *Examiner.*